United States Patent [19]
Emi

[11] Patent Number: 5,715,275
[45] Date of Patent: Feb. 3, 1998

[54] SPECTRUM COMMUNICATION METHOD AND APPARATUS FOR DELAYING READ SEQUENCE SERIES

[75] Inventor: Tetsuichi Emi, Inashiki-gun, Japan

[73] Assignee: Sanyo Electric Co., Ltd., Osaka, Japan

[21] Appl. No.: 628,538

[22] Filed: Apr. 10, 1996

[30] Foreign Application Priority Data

Apr. 13, 1995 [JP] Japan ..................... 7-088277
Feb. 5, 1996 [JP] Japan ..................... 8-019120

[51] Int. Cl.$^6$ ..................... H04B 15/00; H04K 1/00; H04L 27/30
[52] U.S. Cl. ..................... 375/202; 375/200; 375/206
[58] Field of Search ..................... 375/200, 202, 375/206; 455/54.1

[56] References Cited

U.S. PATENT DOCUMENTS

| | | | |
|---|---|---|---|
| 4,694,466 | 9/1987 | Kadin | 375/1 |
| 5,109,390 | 4/1992 | Gilhousen et al. | 375/1 |
| 5,130,987 | 7/1992 | Flammer | 370/103 |
| 5,235,621 | 8/1993 | Amir-Alikhani | 375/100 |
| 5,268,926 | 12/1993 | Sebilet | 375/1 |
| 5,442,660 | 8/1995 | Kuo et al. | 375/202 |
| 5,519,735 | 5/1996 | Rice et al. | 375/347 |
| 5,535,248 | 7/1996 | Kurokami | 375/324 |
| 5,586,120 | 12/1996 | Cadd | 370/468 |

FOREIGN PATENT DOCUMENTS 4344729  12/1992  Japan.

*Primary Examiner*—Stephen Chin
*Assistant Examiner*—Mohammad Ghayour
*Attorney, Agent, or Firm*—Loeb & Loeb LLP

[57] ABSTRACT

For spread spectrum communication using a frequency hopping method, this invention is to provide a method and an apparatus for two-way simultaneous communication for transmitting/receiving with a compact circuit and without lowering a transmission rate. Data to be transmitted is encoded by an encoder circuit, and modulated by a modulator circuit according to FSK or PSK. On the other hand, a frequency synthesizer outputs a spread sequence series for frequency hopping according to a spread sequence control. The output signal from a modulator circuit is mixed by a mixer with the output signal from the frequency synthesizer. The frequency of the output signal from the mixer is shifted to a radio-frequency band by an up converter, and transmitted through a transmitting circuit. The receiver down-converts the received signal and mixes it with the output signal from the frequency synthesizer to extract significant data. The transmitter uses the spread sequence series to transmit, and the spread sequence series from the frequency synthesizer, which is delayed for a prescribed period by a waveform delay circuit, to receive. The receiver uses the spread sequence series from the frequency synthesizer to receive and the spread sequence series from the frequency synthesizer, which is delayed for a prescribed period by the waveform delay circuit, to transmit.

6 Claims, 5 Drawing Sheets

| HOPPING ORDER: | | 1 | 2 | 3 | 4 | 5 | 6 | 7 | 8 | 9 ... |
|---|---|---|---|---|---|---|---|---|---|---|
| TRANS-MITTING SIDE | TRANS-MIT | f1 | f5 | f3 | f7 | f4 | f6 | f2 | | ... |
| | RE-CEIVE | | f1 | f5 | f3 | f7 | f4 | f6 | f2 | ... |
| RE-CEIVING SIDE | RE-CEIVE | f1 | f5 | f3 | f7 | f4 | f6 | f2 | | ... |
| | TRANS-MIT | | f1 | f5 | f3 | f7 | f4 | f6 | f2 | ... |

Fig. 4

SPECTRUM COMMUNICATION METHOD AND APPARATUS FOR DELAYING READ SEQUENCE SERIES

BACKGROUND OF THE INVENTION

1. Field of the Invention

The invention relates to a spread spectrum communication method and apparatus.

2. Description of the Prior Art

A spread spectrum system with remarkable characteristics with respect to interference resistance, signal concealability and high resolution distance surveyability, has been used for satellite communications and ground communications, and is being applied to mobile communications and local communications in recent years.

A representative method for realizing the spread spectrum communication includes a direct sequence (DS) method and a frequency hopping (FH) method. The DS method spread s an occupied bandwidth to a broadband by modulating a direct spread sequence signal by a balanced modulator into an information signal modulated by a carrier. Also, the FH method uses a broad bandwidth by switching the frequency of a carrier for the information signal according to a spread sequence.

FIG. 5 shows a structural diagram of a transceiver according to the conventional FH method.

First, its transmission will be described. Transmit data is encoded by an encoder circuit 41, modulated by a modulating method such as frequency shift keying (FSK) or phase shift keying (PSK) in a modulator circuit 42, and mixed by a mixer 43 with an output from a frequency synthesizer 47. The frequency synthesizer 47 varies (i.e. hops) the output frequencies according to an FH spread sequence series generated by a spread sequence generator circuit 46. Output from the mixer 43 is power amplified by a transmitting circuit 44 and transmitted from an antenna 45.

Now, the transceiver will be described with respect to its receiving operation. A signal received by the antenna 53 is amplified through a band-pass filter in a receiving circuit 52, and mixed by a mixer 51 with an output from a frequency synthesizer 49. The frequency from the frequency synthesizer 49 is hopped according to an FH spread sequence series generated by a spread sequence generator circuit 48. A synchronizing circuit 50 performs a synchronous acquisition and holding operation to synchronize the received signal and the output frequency from the frequency synthesizer 49. The synchronized output from the mixer 51 is demodulated into binary data by a demodulator circuit 55 and is decoded to the original data by a decoding circuit 54.

In the prior art, a transmitter and a receiver are independent of each other and use a different spread sequence series for transmitting and receiving, thereby realizing two-way communications.

However, the prior art has a disadvantage of deteriorating communication performance because the transmitting frequency and the receiving frequency mutually interfere when they are independently hopped at random.

To remedy such a disadvantage, Japanese Patent Laid-Open Publication No. Hei 4-344729 discloses that the transmitting frequency and the receiving frequency are separated by a given frequency and are synchronously hopped to prevent the receiver from interfering with transmission.

However, since the prior art uses a different frequency for transmitting and receiving at the same time, it has disadvantages that the transmitter and the receiver each require a frequency synthesizer, and the configured circuit becomes large in size. To remedy such disadvantages, a time-division two-way communication has been proposed, but this method has disadvantages in that control is complicated, transmitting-receiving switching involves an overhead, and a transmission rate reduced by half or more.

SUMMARY OF THE INVENTION

Accordingly, an object of the invention is to transmit and receive simultaneously with the circuit size made compact and the transmission rate not lowered when the two-way communication is performed using the FH method.

To complete the above object, a spread spectrum communication method according to the invention comprises a method of communicating by sequentially switching a carrier frequency for transmit data according to a spread sequence series for frequency hopping modulation, wherein a spread sequence series for one of transmitting or receiving is delayed for a prescribed period, and the delayed spread sequence series is used for the other.

In this method, the spread sequence series for frequency hopping modulation to be used for one of transmitting or receiving is delayed for a prescribed period, and the delayed spread sequence series for frequency hopping modulation is used for the other. As a result, a single frequency synthesizer can supply the spread sequence series for frequency hopping modulation to be used for transmitting/receiving. Thus, the system using this method can have a compact circuit achieving cost reduction.

In another aspect according to the invention, there is a method of communicating by sequentially switching a carrier frequency for transmit data according to a spread sequence series for frequency hopping modulation, wherein a transmitter or a tramsmitter block delays a spread sequence series to be used for transmitting for a prescribed period and uses the delayed spread sequence series for receiving, and a receiver or a receiver block delays a spread sequence series to be used for receiving for the same period as for the transmitter and uses the delayed spread sequence series for transmitting.

In this method, the transmitter delays the spread sequence series for frequency hopping modulation to be used for transmitting for a prescribed period, and uses the delayed spread sequence series for frequency hopping modulation for receiving, and the receiver delays the spread sequence series for frequency hopping modulation to be used for receiving for the same period as for the transmitter, and uses the delayed spread sequence series for frequency hopping modulation for transmitting. As a result, only one frequency synthesizer can be used to simultaneously transmit and receive. Therefore, once the receiver has made the synchronous acquisition to receive, the transmitter and the receiver can each carry out the two-way simultaneous communication by simply effecting synchronous holding, reduce a period required for the synchronous acquisition, and carry out the simultaneous communication without substantially lowering a transmission rate.

The spread spectrum communication apparatus according to the invention is one which communicates by sequentially switching a carrier frequency for transmit data according to a spread sequence series for frequency hopping modulation, wherein a waveform delay circuit is disposed to delay a spread sequence series for a prescribed period, a transmitter block delays the spread sequence series to be used for transmitting for a prescribed period using the waveform delay circuit and uses a delayed spread sequence series for receiving, and a receiver block delays the spread sequence series to be used for receiving for the same prescribed period as for the transmitter using the waveform delay circuit, and uses the delayed spread sequence series for transmitting.

In this system, the transmitter block delays the spread sequence series for frequency hopping modulation to be used for transmitting for a prescribed period using the waveform delay circuit and uses the delayed spread sequence series for frequency hopping modulation for receiving, and the receiver block delays the spread sequence series for frequency hopping demodulation to be used for receiving for the same period as for the transmitter block using the waveform delay circuit and uses the delayed spread sequence series for frequency hopping modulation for transmitting. As a result, a single frequency synthesizer can be used to simultaneously transmit and receive.

In another aspect according to the invention, the delay period is set to one hopping period.

In this case, when a memory, for example, is used as the delay circuit, the memory capacity can be optimized and the circuit configuration can be simplified.

In another aspect according to the invention, the apparatus is one for communicating by sequentially switching a carrier frequency for transmit data according to a spread sequence series for frequency hopping modulation, which comprises a synthesizing portion for outputting discrete digital waveform data with a prescribed timing, a first digital-analog converting portion for converting a digital signal outputted from the synthesizing portion into an analog signal, a first low pass filtering portion for shaping the waveform of the analog signal outputted from the first digital-analog converting portion, a FIFO memory for temporarily storing a digital signal which is outputted from the synthesizing portion, a second digital-analog converting portion for converting the digital signal which is read from the FIFO memory with a prescribed timing into an analog signal, a second low pass filtering portion for shaping a waveform of the analog signal outputted from the second digital-analog converting portion, and a spread sequence control portion for supplying an output timing of the synthesizing portion and a reading timing of the FIFO memory, wherein a transmitter block uses the output from the first low pass filtering portion to transmit and the output from the second low pass filtering portion to receive, a receiver block uses the output from the second low pass filtering portion to transmit and the output from the first low pass filtering portion to receive, and the spread sequence control portion delays the reading timing from the FIFO memory compared to the output timing from the synthesizing portion for a prescribed period to generate a delay period.

In this aspect, the digital output from the synthesizer is converted into an analog signal by the digital-analog converter, the waveform of the analog signal is shaped by the first low pass filter, the digital output from the synthesizer is written into the FIFO memory, the reading timing from the FIFO memory is delayed for reading out, the digital signal read from the FIFO memory is converted into an analog signal by the second digital-analog converter, and the waveform of the analog signal is shaped by the second low pass filter to generate a prescribed delay period.

In still another aspect of the invention, the apparatus is one for communicating by sequentially switching a carrier frequency for transmit data according to a spread sequence series for frequency hopping modulation, which comprises a synthesizing portion for outputting discrete digital waveform data with a prescribed timing, a first digital-analog converting portion for converting a digital signal outputted from the synthesizing portion into an analog signal, a first low pass filtering portion for shaping the waveform of the analog signal outputted from the first digital-analog converting portion, a FIFO memory for temporarily storing a digital signal which is outputted from the synthesizing portion, a second digital-analog converting portion for converting the digital signal which is read from the FIFO memory with a prescribed timing into an analog signal, a second low pass filtering portion for shaping a waveform of the analog signal outputted from the second digital-analog converter, and a spread sequence control portion for supplying an output timing from the synthesizing portion and a reading timing from the FIFO memory, wherein a switching portion is provided to switch the output from the first low pass filtering portion so as to be used for transmitting or receiving, and to switch the output from the second low pass filtering portion so as to conversely be used for either receiving or transmitting, and the spread sequence control is used to delay the reading timing from the FIFO memory with respect to the output timing from the synthesizer for a prescribed period, to generate a delay period, thereby selectively switching the communication between the transmitter and the receiver.

In this aspect, the output from the first low pass filter and the output from the second low pass filter are switched by the switch and used for transmitting and receiving, respectively. Thus, this apparatus can be used as either of the transmitter and the receiver and does not need to have two different circuits each dedicated for the transmitter or the receiver, enabling a reduction of the production cost.

BRIEF DESCRIPTION OF THE DRAWINGS

FIG. 4 is a schematic diagram showing the transition of a hopping frequency of the transmitter and the receiver of the frequency hopping communication device according to the invention.

DESCRIPTION OF PREFERRED EMBODIMENT

Description will be made of an embodiment of the communication apparatus adopting the frequency hopping method according to the invention, with reference to FIG. 1 through FIG. 3.

[1] Transmission and receipt by transmitter block:

Transmission and receipt by the transmitter block will be described with reference to FIG. 1.

Figure 1:
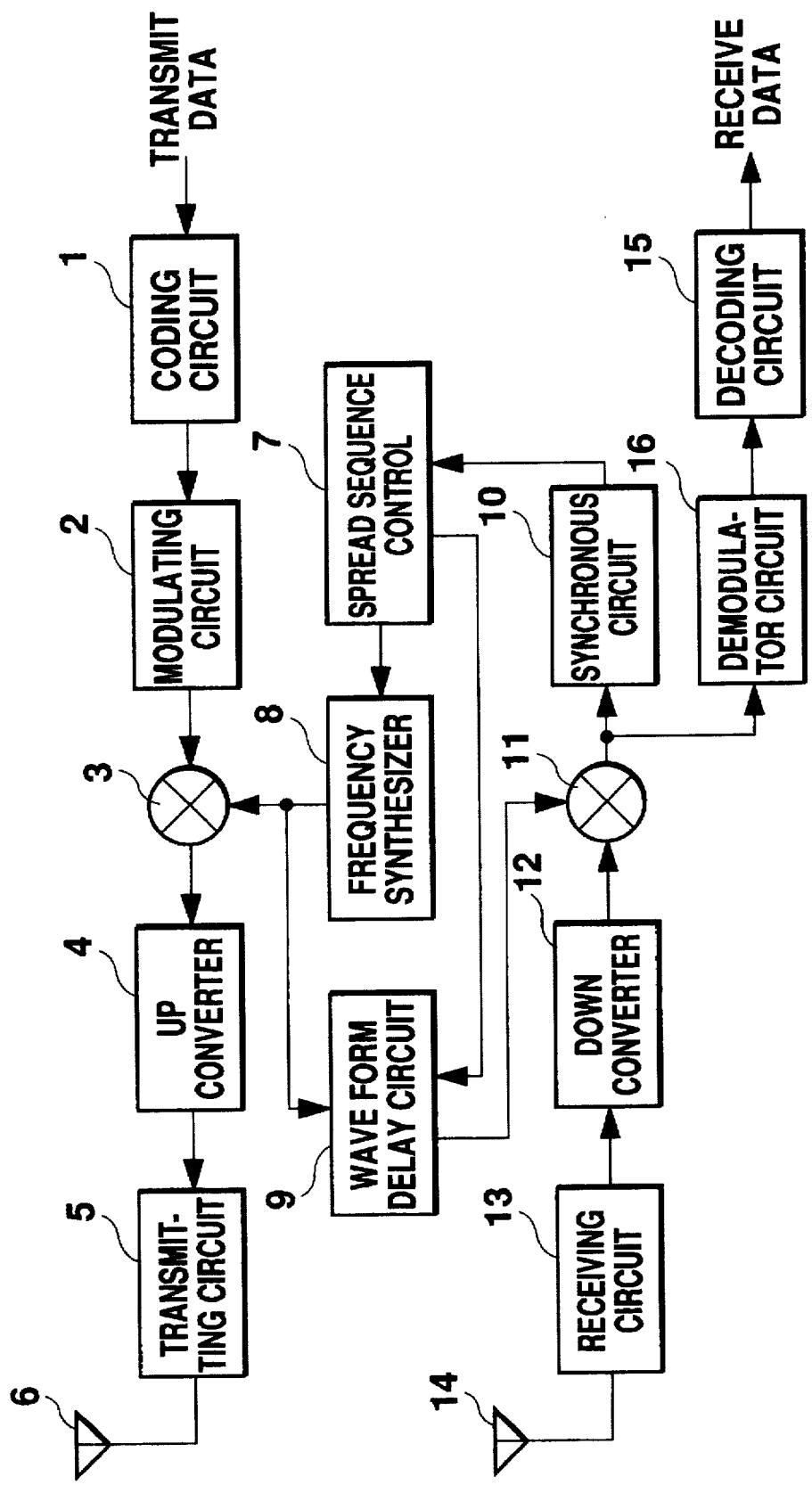
FIG. 1 is a functional block diagram of a transmitter showing one embodiment of the frequency hopping communication device according to the invention.

In FIG. 1, 1 represents an encoder circuit which encodes for compression of data and also encodes for detection and correction of errors, 2 a modulator circuit which modulates information by a modulating method such as frequency shift keying (FSK) or phase shift keying (PSK), 3 a mixer of the transmitter block, 4 a converter which increases a frequency up to a band at which a radiowave is actually transmitted, 5 a transmitting circuit which power amplifies, and 6 a transmitting antenna. Further, 7 represents a spread sequence control circuit which produces an FH spread sequence series and gives data and timing to control a frequency synthesizer 8 and a waveform delay circuit 9 to be described later, 8 the frequency synthesizer which produces a frequency according to the data and timing from the spread sequence control 7, and 9 the waveform delay circuit which accumulates and delays the waveform generated by the frequency synthesizer 8. Reference numeral 14 represents a receiving antenna, 13 a receiving circuit which removes unnecessary elements from a received signal using a band-pass filter and amplifies a filtered signal, 12 a down converter which converts the frequency of an amplified signal to a frequency lower than a processing band, and 11 a mixer for the receiving block. Reference numeral 10 represents a synchronizing circuit which performs a synchronous acquisition and holding operation for the frequency hopping and outputs synchronous timing to the spread sequence control 7, 16 for a demodulator circuit which demodulates the signal modulated by the FSK or PSK method, and 15 for a decoding circuit which detects and corrects errors in data and expands data.

Transmit data is encoded by the encoder circuit 1 and modulated (FSK or PSK) by the modulator circuit 2. The data modulated by the modulator circuit 2 is mixed by the mixer 3 with the output from the frequency synthesizer 8, has its frequency converted to an output frequency by the up converter 4, is amplified by the transmitting circuit 5, and is transmitted from the transmitting antenna 6.

During reception of data, a signal received by the receiving antenna 14 is supplied to the receiving circuit 13, amplified by the band-pass filter which allows a required frequency band to pass, is converted by the down converter 12 to a frequency in a processing frequency band, and is mixed by the mixer 11 with the output from the waveform delay circuit 9. The waveform delay circuit 9 stores up the frequency waveforms from the frequency synthesizer 8 at the time of transmitting, and outputs the waveforms delayed by one hopping period according to the synchronous timing of the spread sequence control 7. The synchronizing circuit 10 performs synchronous acquisition and holding to give the synchronous timing to the spread sequence control 7. When hopping synchronization is executed by the synchronizing circuit 10, the output from the mixer 11 is demodulated to binary data by the demodulator circuit 16, and detection and correction of errors and decoding of data are performed by the decoding circuit 15.

[2] Transmission and receipt by receiver block:

Transmission and receipt by the receiver block will be described with reference to FIG. 2.

Figure 2:
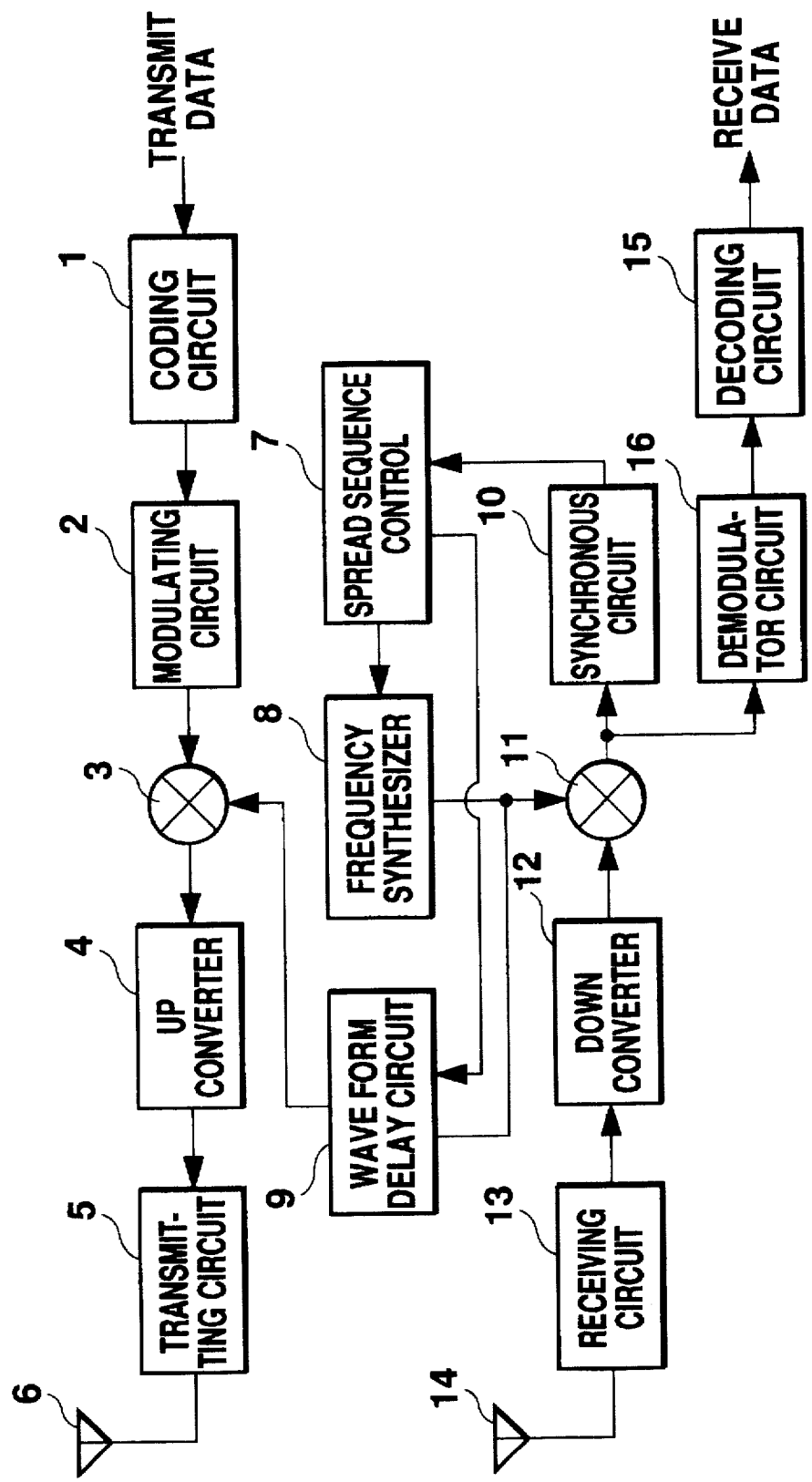
FIG. 2 is a functional block diagram of a receiver showing one embodiment of the frequency hopping communication device according to the invention.

In FIG. 2, reference numerals 1 through 16 will not be described because corresponding parts are operated in the same way as in FIG. 1.

When receiving, a signal received by the receiving antenna 14 is supplied to the receiving circuit 13, is amplified by a band-pass filter which passes only a required frequency band, is converted by the down converter 12 to a frequency within a processing frequency band, and is mixed by the mixer 11 with the output from the frequency synthesizer 8. The synchronizing circuit 10 performs synchronous acquisition and holding to give the synchronous timing to the spread sequence control 7. When hopping synchronization is executed by the synchronizing circuit 10, the output from the mixer 11 is demodulated to binary data by the demodulator circuit 16, and detection and correction of errors and decoding of data are performed by the decoding circuit 15.

Transmit data is encoded by the encoder circuit 1 and modulated (FSK or PSK) by the modulator circuit 2. The data modulated by the modulator circuit 2 is mixed by the mixer 3 with the output from the waveform delay circuit 9, has its frequency converted to an output frequency by the up converter 4, is amplified by the transmitting circuit 5, and is transmitted from the transmitting antenna 6. The waveform delay circuit 9 stores up the frequency waveforms from the frequency synthesizer 8 at the time of receiving, and outputs the waveforms delayed by one hopping period according to the synchronous timing of the spread sequence control 7.

Figure 3:
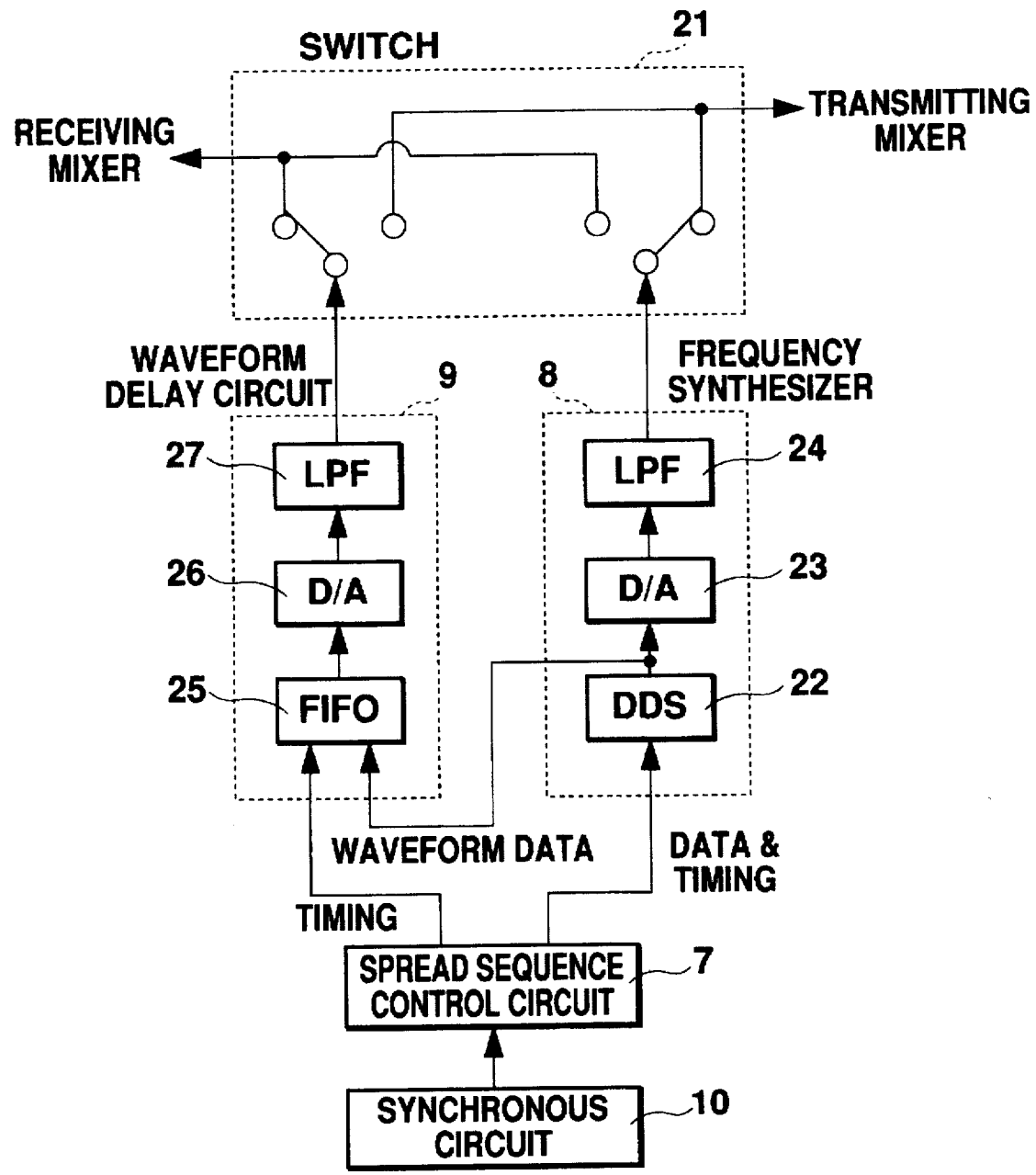
FIG. 3 is a diagram showing one embodiment of the configuration of a frequency synthesizer and a waveform delay circuit for the frequency hopping communication device according to the invention.
Figure 5:
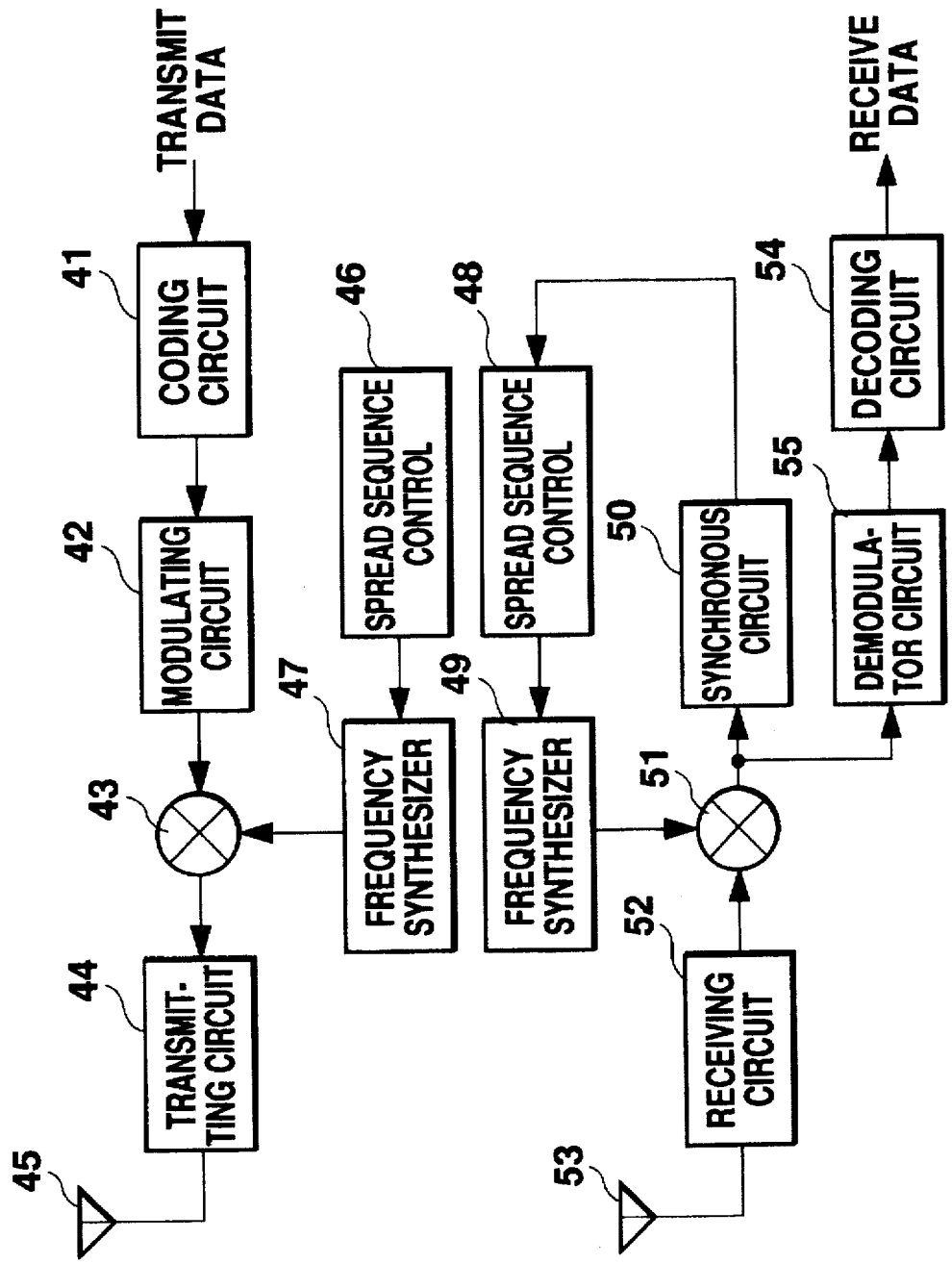
FIG. 5 is a structural diagram of a conventional FH type transceiver.

FIG. 3 is a diagram showing the configurations of the frequency synthesizer 8 and the waveform delay circuit 9.

When a direct digital synthesizer (DDS) 22 is used for the frequency synthesizer 8, discrete digital waveform data from the DDS 22 is subjected to D/A conversion by a D/A converter 23 and is passed through a low pass filter (LPF) 24 to become analog waveform shaped.

In the waveform delay circuit 9, the digital waveform data from the DDS 22 is temporarily stored in an FIFO memory 25 and outputted with a delay, the output is subjected to D/A conversion by a D/A converter 26 in the same way as in the frequency synthesizer 8, and is passed through an LPF 27 to be shaped into an analog waveform. The transmitter and the receiver are not to be fixed, and the output from the frequency synthesizer 8 and the output from the waveform delay circuit 9 are switched by a switch 21, thereby making it possible to switch to the transmitter or the receiver, as desired. The switch 21 is designed to simultaneously switch between the output from the frequency synthesizer 8 and the output from the waveform delay circuit 9, and the two outputs are never connected to the same mixer. Specifically, when the output from the frequency synthesizer 8 is connected to the mixer of the transmitter, the output from the waveform delay circuit 9 is connected to the mixer of the receiver; when the output from the frequency synthesizer is connected to the mixer of the receiver, the output from the waveform delay circuit 9 is connected to the mixer of the transmitter.

FIG. 4 is a schematic diagram showing the transition of a hopping frequency in the transmitter and the receiver.

When it is assumed that the transmitting frequency of the transmitter is hopped, e.g., f1, f5, f3, f7, f4, f6, f2, . . . , the receiver receives data by synchronizing to receive and hop the receiving frequency in the same way as f1, f5, f3, f7, f4, f6, f2, . . . .

The receiver having synchronized to receive delays the hopping frequency by one hopping period and uses it as the transmitting frequency to transmit.

The transmitter delays the transmitting frequency by one hopping period to use it as the receiving frequency, and receives the transmitting data from the receiver without performing synchronous acquisition. In other words, the receiver and the transmitter can each communicate by simply maintaining the synchronization once the receiver has received the data correctly.

As described above, the invention can make the circuit compact, reduce the production cost, allow two-way simultaneous communication by simply carrying out the synchronous holding once the synchronous acquisition is made to receive, reduce a period required for the synchronous acquisition, and carry out the simultaneous communication without substantially lowering a transmission rate.

The embodiment has been described in connection with the delay processing with one hopping period, but the delay may be two hopping periods or more.

The embodiment uses the FIFO memory for the delay circuit to carry out the delay processing, but may use a flip-flop circuit for the delay circuit.

Furthermore, the invention is not limited to the embodiment described above. In the DS method which spread s an occupied bandwidth to a broadband by carrying out the balanced modulation of a spread sequence signal directly with a carrier frequency kept constant, the two-way communication can be carried out by changing a code for transmitting and receiving. In this case, one frequency synthesizer is used for one of the transmitter or the receiver, and a signal from the frequency synthesizer is delayed and can be used for the other.

For the DS method, a communication control method which switches carrier frequencies depending on a receiver (e.g., using a carrier frequency fa to communicate with a communication terminal A and a carrier frequency fb different to fa, to communicate with a communication terminal B) to carry out multiple communications may be used. In this case, multiple frequencies can be produced by a single frequency synthesizer, a different carrier frequency is used depending on a communicating counterpart, this carrier frequency is used for one of the transmitter or the receiver, and a signal outputted from the frequency synthesizer is delayed and can be used for the other, i.e. the receiver or the transmitter.

As described above, the invention can be applied to a apparatus employing the DS method and can make the circuit compact and decrease the production cost in the same way as in the apparatus using the FH method. Besides, once receiving is synchronously acquired, the following two-way simultaneous communication can be carried out by simply effecting the synchronous holding, so that the time required for the synchronous acquisition can be decreased, and the simultaneous communication can be carried out without substantially lowering a transmission rate.

What is claimed is:

1. A spread spectrum communication method for communicating by sequentially switching a carrier frequency for transmit data according to a spread sequence series for frequency hopping modulation, wherein the spread sequence series for either of transmitting or receiving using a certain communication apparatus is delayed for a prescribed period, and the delayed spread sequence series is used for transmitting or receiving using another communication apparatus with which the communication is carried out.

2. A spread spectrum communication method for communicating by sequentially switching a carrier frequency for transmit data according to a spread sequence series for frequency hopping modulation, wherein a transmitter block delays a spread sequence series to be used for transmitting for a prescribed period and uses a delayed spread sequence series for receiving, and a receiver block delays a spread sequence series to be used for receiving for the same period as for the transmitter block and uses the delayed spread sequence series for transmitting.

3. A spread spectrum communication apparatus for communicating by sequentially switching a carrier frequency for transmit data according to a spread sequence series for frequency hopping modulation, wherein a waveform delay circuit is disposed to delay a spread sequence series for a prescribed period, a transmitter block delays a spread sequence series to be used for transmitting for a prescribed period using the waveform delay circuit and uses the delayed spread sequence series for receiving, and a receiver block delays a spread sequence series to be used for receiving for the same prescribed period as for the block transmitter using the waveform delay circuit and uses the delayed spread sequence series for transmitting.

4. The spread spectrum communication apparatus according to claim 3, wherein a delay period given by the waveform delay circuit is a single hopping period.

5. A spread spectrum communication apparatus for communicating by sequentially switching a carrier frequency for transmit data according to a spread sequence series for frequency hopping modulation, comprising:

a synthesizing portion for outputting discrete digital waveform data with a prescribed timing, a first digital-analog converting portion for converting a digital signal outputted from the synthesizing portion into an analog signal, a first low pass filtering portion for shaping a waveform of the analog signal outputted from the first digital-analog converting portion, an FIFO memory for temporarily storing a digital signal which is outputted from the synthesizing portion, a second digital-analog converting portion for converting the digital signal which is read from the FIFO memory with a prescribed timing into an analog signal, a second low pass filtering portion for shaping a waveform of the analog signal outputted from the second digital-analog converting portion, and a spread sequence control portion for supplying an output timing of the synthesizing portion and a reading timing of the FIFO memory, wherein a transmitter block uses the output from the first low pass filtering portion to transmit and the output from the second low pass filtering portion to receive, a receiver block uses the output from the second low pass filtering portion to transmit and the output from the first low pass filtering portion to receive, and the spread sequence control portion delays the reading timing from the FIFO memory than the output timing from the synthesizing portion for a prescribed period to generate a delay period.

6. The spread spectrum communication apparatus according to claim 5, wherein a switching portion is provided to switch the output from the first low pass filtering portion so as to be used for either of transmitting or receiving, and to switch the output from the second low pass filtering portion so as to conversely be used for either receiving or transmitting, and the communication apparatus is selectively switched between the transmitter and the receiver.

* * * * *